United States Patent [19]

Schneider

[11] Patent Number: 4,885,009
[45] Date of Patent: Dec. 5, 1989

[54] COAXIAL SCREEN FILTER

[75] Inventor: William R. Schneider, Athens, Ohio

[73] Assignee: Battelle Memorial Institute, Columbus, Ohio

[21] Appl. No.: 269,203

[22] Filed: Nov. 9, 1988

[51] Int. Cl.$^4$ ............................................. B01D 46/04
[52] U.S. Cl. ..................................... 55/96; 55/284; 55/291; 55/300; 55/527
[58] Field of Search ................ 55/96, 97, 284, 285, 55/291, 300, 302, 304, 516, 518, 527

[56] References Cited

U.S. PATENT DOCUMENTS

| | | | |
|---|---|---|---|
| 2,796,950 | 6/1957 | Hersey | 55/527 X |
| 3,901,671 | 8/1975 | Kitami | 55/304 |
| 3,977,847 | 8/1976 | Clark | 55/96 |
| 4,540,625 | 9/1985 | Sherwood | 55/527 X |
| 4,590,039 | 5/1986 | Cheng | 55/302 X |
| 4,680,040 | 7/1987 | Gooray et al. | 55/527 X |

*Primary Examiner*—Charles Hart
*Attorney, Agent, or Firm*—Philip M. Dunson

[57] ABSTRACT

Methods and apparatus for removing a pollutant such as dust (33) from a fluid stream (34). A nested array of fibers (35) is provided in a substantially annular container (36) having openings in its inner (32) and outer (31) cylindrical sides of such size as to retain the fibers (35) within the container while permitting fluid (34) to pass through easily, and the pollutant-containing fluid stream (34) is passed through at least a substantial portion of the container (36) from a region (37) outside the outer side (31) to a region (38) inside the inner side (32). Thus a substantial fraction of the pollutant (33) is separated from the fluid stream (34) in a portion of the nested array (35) generally nearer to the outer side (31) of the container (36) than to the inner side (31).

From time to time the container (36) is rotated about its axis to remove a substantial fraction of the separated pollutant (33) from the nested array (35), by tumbling action and by the force of gravity, through the openings in the outer side (31) of the container (36). To assist in this removal, purging fluid (41) may be directed back through the container (36) from the inner side (32) during the tumbling.

15 Claims, 4 Drawing Sheets

COAXIAL SCREEN FILTER

FIELD

This invention relates to methods and apparatus for removing pollutants such as dust from fluid streams. It is especially useful and efficient in the removal of particles having diameters in the range of about 50 micrometers or less from fluid streams, and entails relatively low pressure drop.

In typical methods and apparatus according to the present invention for removing a pollutant such as dust from a fluid stream, a nested array of fibers is provided in a substantially annular container having openings in its inner and outer cylindrical sides of such size as to retain the fibers within the container while permitting fluid to pass through easily, and the pollutant-containing fluid stream is passed through at least a substantial portion of the container from a region outside the outer side to a region inside the inner side. Thus a substantial fraction of the pollutant is separated from the fluid stream in a portion of the nested array generally nearer to the outer side of the container than to the inner side.

From time to time the container is rotated about its axis to remove a substantial fraction of the separated pollutant from the nested array by tumbling action and by the force of gravity through the openings in the outer side of the container. To assist in this removal, purging fluid may be directed back through the container from the inner side during the tumbling.

BACKGROUND

The removal of particulate matter from air streams is typically done now with baghouses or electrostatic precipitators and from liquids with screens or filters. Baghouses usually employ fabrics which serve as the support for the buildup of a filter cake. Periodically, the filter cake is shaken or blown loose from the fabric and collected, and the cycle is repeated.

Typical pressure drops are on the order of 10-20 cm WC (water column). As might be expected, there is some loss of efficiency after the cake is removed during the cleaning cycle and there tends to be a relatively high pressure drop during the latter phase of filtration just prior to cleaning. Furthermore, baghouse fabrics may blind due to lodging of fine particles or sticky materials in the pores of the fabric.

In addition to commercial baghouses and electrostatic precipitators, research and development work has been done on recirculating. granular-bed filters. These filters comprise a bed of granules in which the granules are recycled out the bottom of the bed, cleaned, and returned to the top. Dirty gas flows from side to side or from bottom to top, countercurrent to the granule movement.

The advantages of Pressurized Fluidized-Bed Combustion (PFBC) in a combined cycle mode to produce electricity include:
  *Potential overall efficiencies greater than 40 percent
  *Control of $SO_x$, and $NO_x$ emissions well below EPA's New Source
  Performance Standards (NSPS).

As part of their PFBC program, a major developmental thrust of the U.S. Department of Energy (DOE), has been high temperature, high pressure (HTHP) particulate removal to meet turbine requirements and Environmental Protection Agency (EPA) standards of particulate emissions. Customarily, at least two separate stages of filtration are used: (1) a cyclone prefilter to scavenge large particulates (at least 20 micrometers in diameter); and (2) a primary filter to remove fine dust. The filtration requirements are set by protection of the gas turbine from erosive damage and by EPA/NSPS emission constraints.

Fabric filters arrayed in a baghouse comprise one of the technologies of choice in contemporary developments. The baghouse can be an expensive component (around 25 percent of the capital cost of an FBC installation) and also can pose some significant operational expenses in maintenance. While much progress has been made, the goal of achieving high collection efficiency at high temperature and pressure is yet to be reached with such filters.

Figure 1:
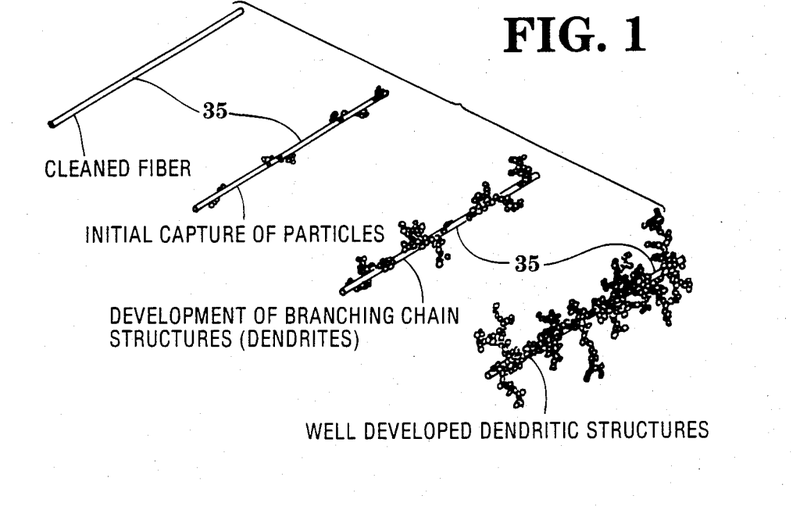
FIG. 1 is a normal view of typical fibers used in the present invention, illustrating the formation and growth of dendrites on an individual fiber.

The present novel concept of a coaxial screen filter with tumble regeneration has been demonstrated to provide over 99.9 percent efficiency at relatively low pressure drop in laboratory tests. The concept is based upon filtration through fibrous media that support the buildup of chain-like dust agglomerates (dendrites) which have been shown to be one of the most effective means for collection of micrometer and submicrometer particulates from gas streams (see FIG. 1). Fibrous media filters differ from fabric filters (baghouses) because the dust is deposited mainly on sites within the interior of the fiber bed, while the dust forms an external cake on the surface of a fabric filter. Fibrous media filtration provides the advantage of high efficiency at high gas flow rates. On a comparable basis, pressure drop for a fibrous filter is lower than for a baghouse.

The chief reason for the lack of wide acceptance of fibrous media filtration in the industrial market is related to the need for frequent cleaning or regeneration of the fiber bed. Consequently, fibrous filters have been employed only for single-use applications such as residential furnace filters, respirator masks, and emergency filters for radioactive particle leaks. The present invention overcomes the regeneration problem and maximizes the advantages of dendrite filtration. 5 It has been found that the dendritic capture may be increased and the pressure drop decreased by increasing voidage. This leads to lower operating costs. One of the advantages of a fiber filter over a granular filter is the ability to develop and control this high voidage. The term voidage is intended to mean the percentage of a 30 particular space that is empty of solids. It is calculated by determining the volume of the filter occupied by fibers. $V_f$, as by dividing the mass of fibers by the density of the fiber material. The volume of empty space is then the total filter volume less the volume of fibers, $V_T - V_f$, and the voidage is the empty volume expressed as a fraction of the total volume, $$\text{voidage} = \frac{V_T - V_f}{V_T}.$$

The high voidage is created by a nesting or loose packing phenomenon. It has been found that high-aspect-ratio fibers tend to nest in a rather rigid, high voidage array when they are loosely poured into a container. The nesting is a matter of degree. For capturing fine particles in the 1-20 micrometer range, fibers in the range of about 0.075 to 2 mm diameter and aspect ratios of above about 20 are preferred in the present invention. The voidage appears to vary linearly with aspect ratio of the fibers.

The nesting of fibers also provides a second advantage over the packing of granules in the granular-bed filters. The fiber nests tend to be quite rigid compared with the loose granules. Thus, dendritic formations contributing to good capture are retained in the cohesive fiber bed during operation. On the contrary, dust captured between bed granules can be lost by the downward movement of the loose granules in a granular bed filter.

The fibers may be made of any useful material including both organic and inorganic materials. They may merely physically capture a particulate or they may react chemically with a particulate or gas. The fibers may also be catalytic or be coated with inert, reactant, or catalytic material. For example, metal fibers may have a catalytic coating to convert $SO_2$ in flue gas to $SO_3$, or a lime coating that can react with the $SO_2$ to produce a $CaSO_4$ deposit on the fiber.

Refractory fibers, as well as metal fibers, can be used for high temperature applications. For example, catalytic cracking of high-boiling hydrocarbons to gasoline fractions can take place at about 500 C. with fibers made or coated with modified, hydrated alumina silicates. Deposited carbon can be removed by burning in air in the regenerator.

An advantage of the present invention is the high face velocity that is possible for effective filtration at low pressure drop. Face velocities of 200 fpm are possible compared to velocities of 2–4 fpm for bag filters.

The present invention provides reliable operation at high temperatures, such as 2000 F. and above, and at high pressures, such as 350 psig and above, as well as at lower temperatures and pressures. Other advantages include operation with lower pressure drops than are usually obtained with known apparatus, higher reliability, and the ability to operate continuously without interruption for cleaning.

High temperature, high pressure (HTHP) gases from operations such as pressurized fluid-bed combustion (PFBC), integrated gasifications combined cycle (IGCC), and direct coal-fired turbines require very efficient particle control. The present invention provides such control.

DISCLOSURE

Typical apparatus according to the present invention for removing a pollutant such as dust from a fluid stream comprises a nested array of fibers in a substantially annular container having openings in its inner and outer cylindrical sides of such size as to retain the fibers within the container while permitting fluid to pass through easily, means for passing the pollutant-containing fluid stream through at least a substantial portion of the container from a region outside the outer side to a region inside the inner side, means for separating a substantial fraction of the pollutant from the fluid stream in a portion of the nested array generally nearer to the outer side of the container than to the inner side, and means for rotating the container about its axis from time to time to remove a substantial fraction of the separated pollutant from the nested array by tumbling action and by the force of gravity through the openings in the outer side of the container.

The apparatus typically comprises also means for directing the fluid stream from the region inside the inner side via output valve means to means for utilizing the cleaned fluid, and the output valve means is closed during the times when the container is rotated. Typically the pollutant that is removed drops into a region below the container, and the apparatus comprises also means for directing the pollutant thence from time to time via a pollutant outlet valve to means for disposing of the pollutant.

Typical apparatus according to the invention comprises also at least one additional combination of such container, array of fibers, and output valve means to form a filter system through which the fluid may pass to the means for utilizing the cleaned fluid, and at least one output valve means is open at any given time during operation, to provide a path for the fluid stream through the filter system.

Apparatus according to the invention may comprise also means for directing fluid, during the rotation of the container with the output valve closed, via purge valve means back through the region inside the inner side into and through the annular container to the region around the outer side, to assist in the removal of pollutant from the container and to avoid any flow of pollutant into the region inside the inner side of the container.

The outer cylindrical side of the annular container, the inner cylindrical side, or each of them, may comprise a pair of substantially parallel walls in which each opening in one wall is located opposite an obstructing area in the other wall, to assure an absence of any straight path by which a loose fiber could pass through both walls.

CARRYING OUT THE INVENTION

Figures 2, 2A:
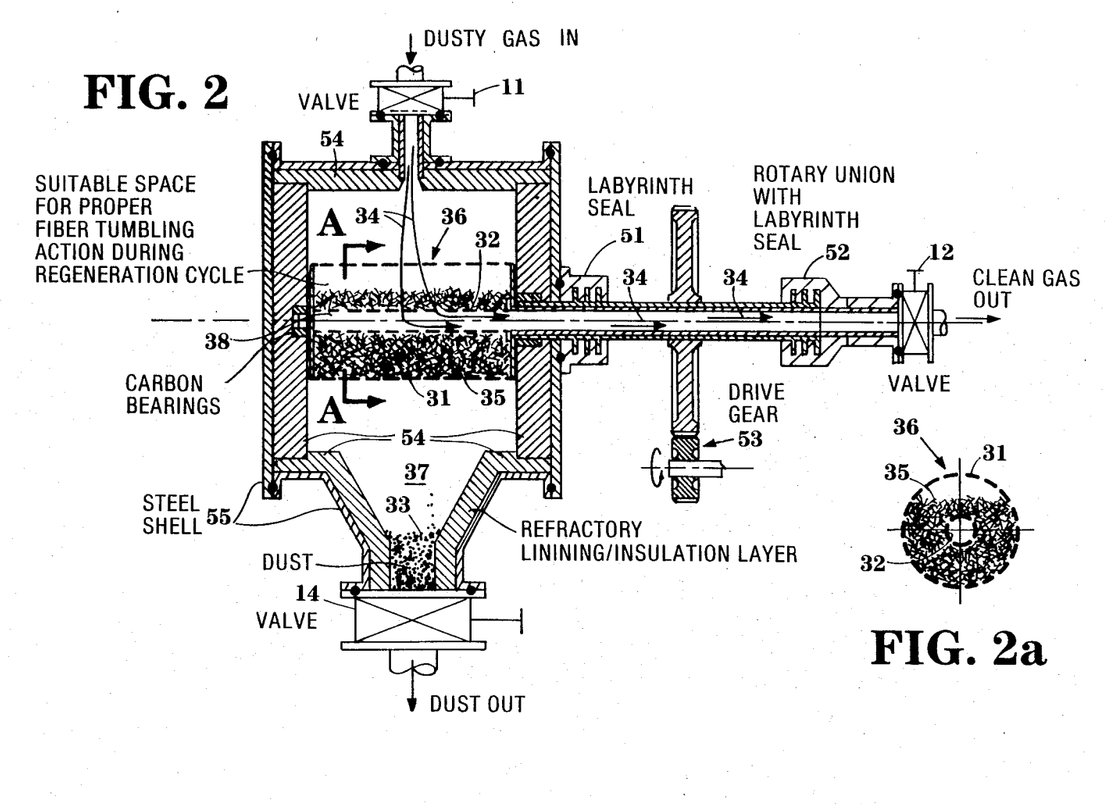
FIG. 2 is a front sectional view of a typical coaxial screen filter with tumble regeneration according to the present invention.
FIG. 2a is a vertical sectional view of a portion of the apparatus in FIG. 2, taken on the plane A—A in FIG. 2.

A typical embodiment of the invention, illustrated in FIG. 2, utilizes a regenerative batch type operating principle. The filter is placed in operation and used until it becomes dust laden. When effectiveness begins to diminish, the flow of hot gas 34 is diverted to another parallel unit. Soon after the gas 34 is diverted to the clean unit and isolated from the dirty unit, the cylindrical basket 36 containing the fibers 35 is rotated to tumble the fibers 35 and dislodge dust 33 from the surface of the fibers 35. The loosened dust 33 escapes through openings in the cylindrical basket 36 as the fibers 35 tumble. Some dust 33 may also fall inside the smaller gas exit tube 32. It can be trapped by the second filter during a filter seasoning cycle to be described later. The larger area and physical placement of the outer basket screen 31 allows the greatest portion of the dislodged dust 33 to fall down into a hopper (not shown) located at the bottom of the device for subsequent collection and disposal.

Because the only motion involved in the tumbling of the filters is rotary, labyrinth seals 51, 52 can be used to prevent hot gas 34 from escaping. The drive mechanism 53 can be located outside of the hot chamber 37 for long life and straightforward design. A refractory insulating lining 54 can be used inside the vessel to prevent the shell 55, typically made of steel, from reaching the temperature of the hot gas 34. The filter chamber 37 is designed to the pressure and temperature requirements for the specific applications.

The cleaning cycle can dislodge dust particles 33 that may not fall into the hopper. Some of the dust particles 33 may remain within the fiber mass 35, and others may drop into the gas exit tube 38. So the initial gas flow through the filter after the tumble regeneration may carry a cloud of dust with it. This dust can not be permitted to reach the downstream machinery, and it must first be passed through another filter. The process of blowing loose dust away and coating the fibers with efficiency enhancing dendrites of dust is called "seasoning".

Figure 3:
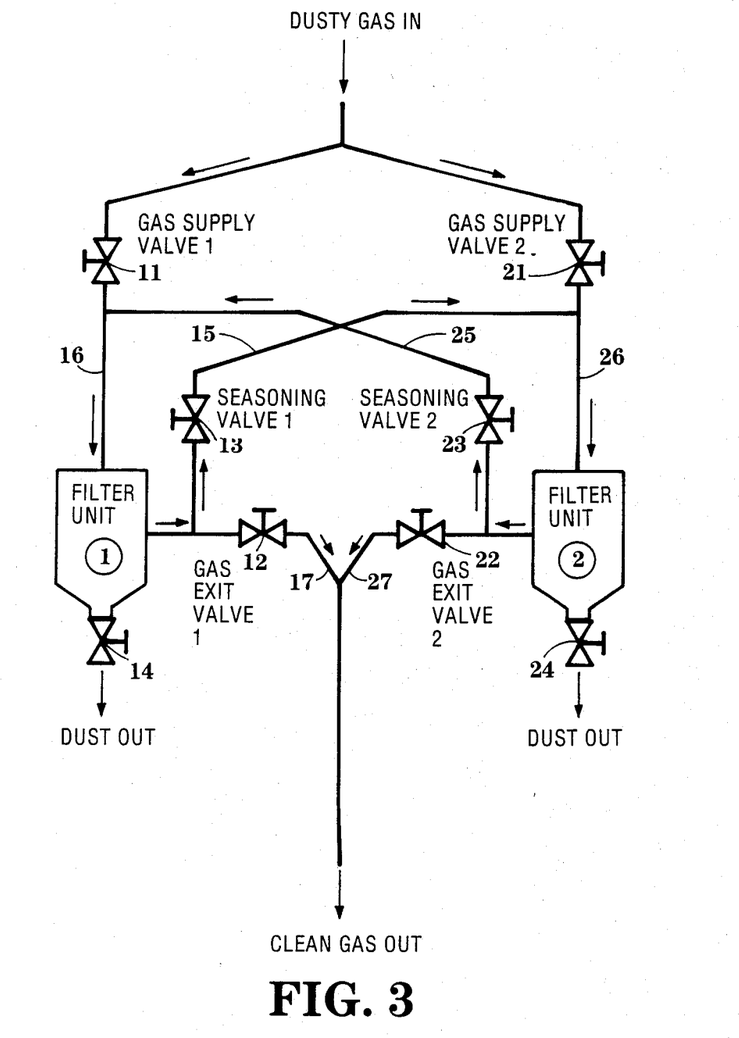
FIG. 3 is a schematic diagram of a typical regenerative filter system according to the present invention.

A typical piping and valving arrangement allowing the seasoning of one filter while temporarily filtering the discharge through another filter is shown in FIG. 3. It may, of course, be extended to include more than two filter units where desired.

Referring to FIG. 3, typical steps to clean a filter that has become dust laden are now described. Consider the condition when the filter 1 is in service; and the filter 2 has been seasoned and is in operation, its gas supply valve 21 and its gas exit valve 22 being open and its seasoning valve 23 being closed. When the filter 1 requires cleaning, its gas supply valve 11 and its gas exit valve 12 are closed. The seasoning valve 13 already was closed. No gas flows through the filter 1 during its tumbling and regeneration cycle, and all hot dirty gas flows through the filter 2 for cleaning.

The filter 1 then begins its regeneration cycle. Referring now to FIG. 2, the fiber screen containers 31, 32 are rotated to dislodge the dust from the fibers. Most of the dust falls through a dust out valve 14 into a hopper (not shown) located below the filter, and then is discharged via lock hoppers (not shown) into a dust disposal system. After the dust has been removed and the filter 1 is to be reactivated, it goes through the seasoning cycle to purge loose dust before being reconnected to discharge directly to the turbine. The supply valve 11 and the seasoning valve 13 are slowly opened to allow the gas to flow through the filter 1 and thence through the filter 2 during the seasoning cycle. Later, the gas supply valve 21 is closed, so that all of the gas is directed through the filter 1 and the filter 2 in series.

Still later the gas exit valve 12 is opened and the seasoning valve 13 is closed. The gas exit valve 22 of the filter 2 is closed, so that all of the gas flows through the filter 1. When desired, the filter 2 can be regenerated in the same manner just described for the filter 1.

In the regeneration cycle for the filter 2' the fiber screen containers 31, 32 are rotated to dislodge the dust from the fibers. Most of the dust falls through a dust out valve 24 into a hopper (not shown) located below the filter, and then is discharged via lock hoppers (not shown) into a dust disposal system. After the dust has been removed and the filter 2 is to be reactivated, it goes through the seasoning cycle to purge loose dust before being reconnected to discharge directly to the turbine. The supply valve 21 and the seasoning valve 23 are slowly opened to allow the gas to flow through the filter 2 and thence through the filter 1 during the seasoning cycle. Later, the gas supply valve 11 is closed, so that all of the gas is directed through the filter 2 and the filter 1 in series.

Still later, the gas exit valve 22 is opened and the seasoning valve 23 is closed. The gas exit valve 12 of the filter 1 is closed, so that all of the gas flows through the filter 2. When desired, the filter 1 can be regenerated again, as described, and so on.

Where cleaning cycle times prove to be longer than the time required to fill a filter with dust, three or more filter units should be used. The cleaning cycle time can be determined by experimental testing.

Figure 4:
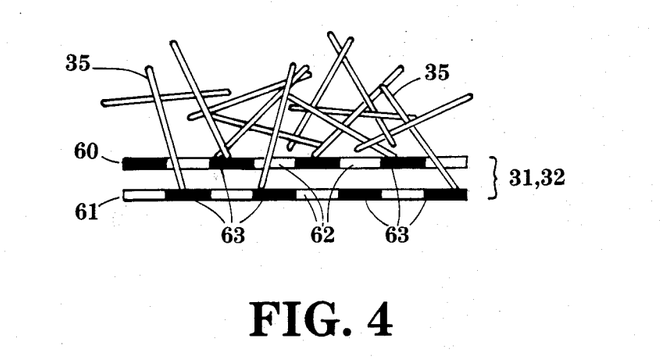
FIG. 4 is a schematic cross-sectional view of an optional double-wall arrangement for use in the present invention.

Typically the basket 31 containing the fibers is constructed in a double-wall arrangement as shown in FIG. 4 to aid fiber retention during the tumbling action (like an electric clothes dryer) in regeneration. The holes in the two walls should be offset to prevent a straight-through fiber-escape path. Dust removal is not greatly affected. The dust passes through readily because of its relatively small size, even when agglomerated. This construction allows the use of large nonclogging holes in the basket while still retaining the relatively long small-diameter fibers. The double-wall construction may also be used for the gas-exit collection tube 32 inside the fiber containment basket 31 for the same reason.

Engineering evaluations have shown the present invention to provide an excellent compromise between technical feasibility considerations and other desirable features, including in-situ regeneration, dust collection without second-fluid purging, and a minimum of moving parts exposed directly to heat. The design is straightforward, and all parts except the fiber-containment basket 31 and the perforated gas collection tube 32, can be readily insulated from direct heat, so as to operate cooler. Enabling the structural components (pressure vessel, etc.) to operate at temperatures in the neighborhood of 360 K. (200 F.) instead of about 1200 K. (1700 F.) increases their strength about twentyfold. The collected dust can be stored in a large vessel located beneath the filter to extend the period between discharges, if desired. Pressurized labyrinth seals can be readily used on rotating junctions to prevent dust plugging and discharging of hot gases to the atmosphere.

In some equipment it may not be sufficient to rely on gravity alone to expel dislodged dust. The following approach uses purge air to assist gravity separation. Separation of dust from the purge air is achieved in a straightforward manner, and the purge air energy is used downstream rather than discarded to the atmosphere. Only one pressure vessel is needed instead of multiple separate units, thus minimizing size and cost. Another advantage is elimination of the individual inlet valves (as in FIG. 3), which are expensive because they must withstand high temperatures and abrasive solids.

Figure 5:
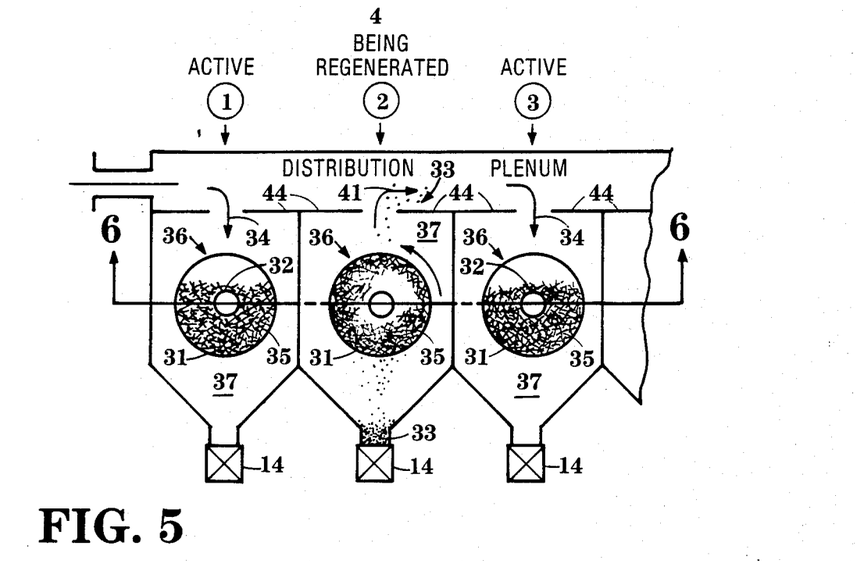
FIG. 5 is a schematic front cross-sectional view of another typical embodiment of the present invention.
Figure 6:
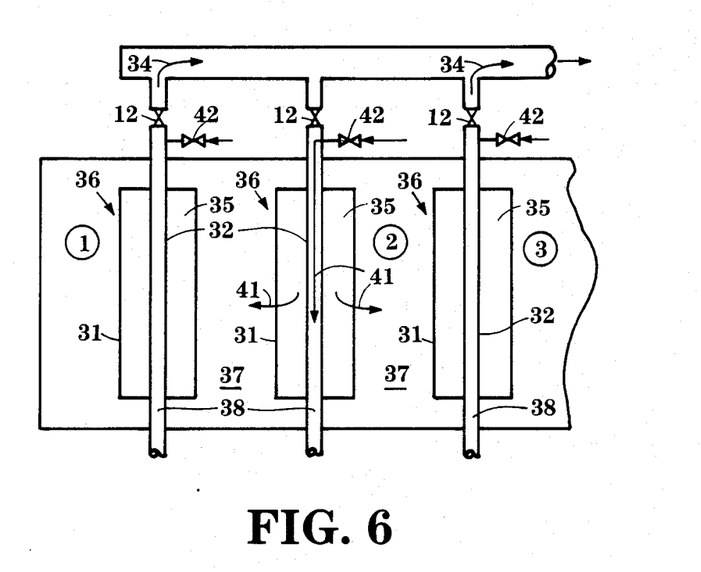
FIG. 6 is a schematic top cross-sectional view of apparatus as in FIG. 5, taken on the plane 6—6 in FIG. 5.

A number of filters are contained in a single vessel, but they are individually baffled to shield each filter from a direct flow of incoming gas. FIGS. 5 and 6 show a typical arrangement of the filters in a vessel. Where purge air 41 (FIG. 6) is required to assist the mechanical agitation of the fibers 35 during cleaning (regeneration), it entrains some dust 34. Shielding each filter (as at 44 in FIG. 5) from direct gas flow during cleaning, helps much of the agglomerated dust 33 to fall to the hopper by gravity. The remaining dust 33 is entrained in the volume of air 41 blown back through the filter, and is swept along with the incoming gas stream 34 for filtering at another station. The purge air 41 can be pulsed rather than continuous to allow time for dust 33 to settle out by gravity into the capturing hopper. This relieves some of the dust load on the active filters in the other stations, but takes more time to clean.

The following sequence describes how the purge operation assists in cleaning the filter unit no. 2 in FIGS. 5 and 6.

The purge operation provides a reverse gas flow 41 to keep solids from depositing in the outlet pipe 32 during the cleaning operation. The outlet valve 12 is closed and the purge valve 42 is opened to introduce an independent gas flow 41 into the system. When the cleaning operation is completed, the purge valve 42 is closed and the outlet valve 12 is opened to reestablish active filtering through the filter no. 2.

To summarize in the language of the claims, and referring especially to FIG. 2, typical apparatus according to the present invention for removing a pollutant such as dust 33 from a fluid stream 34 comprises a nested array of fibers 35 in a substantially annular container 36 having openings in its inner 32 and outer 31 cylindrical sides of such size as to retain the fibers 35 within the container while permitting fluid 34 to pass through easily, means for passing the pollutant-containing fluid stream 34 through at least a substantial portion of the container 36 from a region 37 outside the outer side 31 to a region 38 inside the inner side 32, means for separating a substantial fraction of the pollutant 33 from the fluid stream 34 in a portion of the nested array 35 generally nearer to the outer side 31 of the container 36 than to the inner side 31, and means for rotating the container 36 about its axis from time to time to remove a substantial fraction of the separated pollutant 33 from the nested array 35, by tumbling action and by the force of gravity, through the openings in the outer side 31 of the container 36.

The apparatus typically comprises also means for directing the fluid stream 34 from the region 38 inside the inner side 32 via an output valve 12 to means for utilizing the cleaned fluid, and the output valve 12 is closed during the times when the container 36 is rotated. Typically the pollutant 33 that is removed drops into a region below the container 36, and the apparatus comprises also means for directing the pollutant thence from time to time via a pollutant outlet valve 14 to means for disposing of the pollutant.

Typical apparatus according to the invention, as in FIGS. 3, 5, and 6, comprises also at least one additional combination of such container 36. array of fibers 35, and output valve means 12 to form a filter system through which the fluid 34 may pass to the means for utilizing the cleaned fluid, and at least one output valve means 12 is open at any given time during operation, to provide a path for the fluid stream 34 through the filter system.

As illustrated in FIGS. 5 and 6, apparatus according to the invention may comprise also means for directing fluid 41, during the rotation of the container 36 with the output valve 12 closed, via purge valve means 42 back through the region 38 inside the inner side 32 into and through the annular container 36 to the region 37 around the outer side 31, to assist in the removal of pollutant 33 from the container 36 and to avoid any flow of pollutant 33 into the region 38 inside the inner side 32 of the container 36.

As illustrated in FIG. 4, the outer cylindrical side 31 of the annular container 36, the inner cylindrical side 32, or each of them, may comprise a pair of substantially parallel walls 60, 61 in which each opening 62 in one wall 60 or 61 is located opposite an obstructing area 63 in the other wall 61 or 60, to assure an absence of any straight path by which a loose fiber 35 could pass through both walls 60, 61. A typical method according to the present invention for removing a pollutant such as dust 33 from a fluid stream 34 comprises providing a nested array of fibers 35 in a substantially annular container 36 having openings in its inner 32 and outer 31 cylindrical sides of such size as to retain the fibers 35 within the container while permitting fluid 34 to pass through easily, passing the pollutant-containing fluid stream 34 through at least a substantial portion of the container 36 from a region 37 outside the outer side 31 to a region 38 inside the inner side 32, separating a substantial fraction of the pollutant 33 from the fluid stream 34 in a portion of the nested array 35 generally nearer to the outer side 31 of the container 36 than to the inner side 31, and rotating the container 36 about its axis from time to time to remove a substantial fraction of the separated pollutant 33 from the nested array 35' by tumbling action and by the force of gravity, through the openings in the outer side 31 of the container 36.

Typically the fluid stream 34 is directed from the region 38 inside the inner side 32 via output valve means 12 to means for utilizing the cleaned fluid, and the output valve means 12 is closed during the times when the container 36 is rotated. Typically the pollutant 33 that is removed drops into a region below the container 36 and thence from time to time is directed via a pollutant outlet valve 14 to means for disposing of the pollutant.

In typical methods according to the invention, as illustrated in FIGS. 3, 5, and 6, at least one additional combination of such container 36, array of fibers 35, and output valve means 12 is provided to form a filter system through which the fluid 34 may pass to the means for utilizing the cleaned fluid, and at least one output valve means 12 is open at any given time during operation, to provide a path for the fluid stream 34 through the filter system.

In such methods each (filter) combination of container 36, array of fibers 35, and output valve means 12 typically comprises also input valve means 11 between the source of the fluid stream and the (input) region 37 outside the outer side 31 of the annular container 36, means 15, 25 for directing fluid 34 via seasoning valve means 13, 23 from the (output) region 38 inside the inner side 32 of the annular container 36 to the (input) region 37 outside of the outer side 31 of the annular container 36 in another such combination 36, 35, 12, and the filter combinations 36, 35, 12 are cleaned from time to time by the following steps:

with a first filter combination (1) (FIG. 3) and a second filter combination (2) both in (filtering) operation (both input valve means 11, 21 open, both output valve means 12, 22 open, and both seasoning valve means 13, 23 closed), cleaning the first filter combination (1) by closing the input 11 and output 12 valve means of the first filter combination (1), rotating the container 36 in the first filter combination (1) until at least a substantial fraction of the pollutant 33 has been removed therefrom and has dropped into a region below the container 36, A. gradually opening the input 11 and seasoning 13 valve means of the first filter combination (1) so that one portion of the fluid stream 34 flows first through the first filter combination (1). via 16, 15, and thence through the second filter combination (2), via 26' 27, while another portion of the fluid stream 34 continues to flow directly from the source through the second filter combination (2), via 26. 27, B. closing the input valve means 21 of the second filter combination (2) so that the fluid stream 34 flows therethrough only via the first filter combination (1), via 16, 15, 26, 27, C. opening the output valve means 12, and closing the seasoning valve means 13, of the first filter combination (1), D. closing the output valve means 22 of the second filter combination (2).

E. rotating the container 36 in the second filter combination (2) until at least a substantial fraction of the pollutant 33 has been removed therefrom and has dropped into a region below the container 36, F. gradually opening the input 21 and seasoning 23 valve means of the second filter combination (2) so that one portion of the fluid stream 34 flows first through the second filter combination (2), via 26, 25, and thence through the first filter combination (1), via 16, 17, while another portion of the fluid stream 34 continues to flow directly from the source through the first filter combination (1), via 16, 17, G. closing the input valve means 11 of the first filter combination (1) so that the fluid stream 34 flows therethrough only via the second filter combination (2) via 26, 25, 16, 17, H. opening the output valve means 22, and closing the seasoning valve means 23, of the second filter combination (2), and I. closing the output valve means 12 of the first filter combination (1), J. rotating the container 36 in the first filter combination (1) until at least a substantial fraction of the pollutant 33 has been removed therefrom and has dropped into a region below the container 36, and so on (steps A. through J.) repeatedly as long as desired.

As illustrated in FIGS. 5 and 6, in other typical methods according to the invention, during the rotation of the container 36 with the output valve 12 closed, fluid 41 may be directed via purge valve 42 means back through the region 38 inside the inner side 32 into and through the annular container 36 to the region 37 around the outer side 31, to assist in the removal of pollutant 33 from the container 36 and to avoid any flow of pollutant 33 into the region 38 inside the inner side 32 of the container 36.

The title page and pages 22-24, 27, 29, 32, 34-37, 46, and 48-62 of Final- Report on Nested-Fiber Filter For High-Temperature and High-Pressure Particulate Removal to U.S. Department of Energy Morgantown Energy Technology Center, July 31, 1988, by Robert D. Litt and H. Nicholas Conkle (Battelle Columbus Division, 505 King Avenue, Columbus, Ohio 43201-2693) are filed as an appendix to this specification, and are hereby incorporated by reference into this patent. Some of the useful results of the present invention and advantages over prior NFF methods and apparatus are brought out therein.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

What is claimed is:

1. A method for removing a pollutant such as dust from a fluid stream comprising providing a nested array of fibers in a substantially annular container having openings in its inner and outer cylindrical sides of such size as to retain the fibers within the container while permitting fluid to pass through easily, passing the pollutant-containing fluid stream through at least a substantial portion of the container from a region outside the outer side to a region inside the inner side, separating a substantial fraction of the pollutant from the fluid stream in a portion of the nested array generally nearer to the outer side of the container than to the inner side, and rotating the container about its axis from time to time to remove a substantial fraction of the separated pollutant from the nested array by tumbling action and by the force of gravity through the openings in the outer side of the container.

2. A method as in claim 1, wherein the fluid stream is directed from the region inside the inner side via output valve means to means for utilizing the cleaned fluid.

3. A method as in claim 2, wherein the output valve means is closed during the times when the container is rotated.

4. A method as in claim 1, wherein the pollutant that is removed drops into a region below the container and thence from time to time is directed via a pollutant outlet valve to means for disposing of the pollutant.

5. A method as in claim 2, wherein at least one additional combination of such container, array of fibers, and output valve means is provided to form a filter system through which the fluid may pass to the means for utilizing the cleaned fluid, and at least one output valve means is open at any given time during operation, to provide a path for the fluid stream through the filter system.

6. A method as in claim 5, wherein each (filter) combination of container, array of fibers, and output valve means comprises also input valve means between the source of the fluid stream and the (input) region outside the outer side of the annular container, means for directing fluid via seasoning valve means from the (output) region inside the inner side of the annular container to the (input) region outside of the outer side of the annular container in another such combination, and wherein the filter combinations are cleaned from time to time by the following steps:

with a first filter combination and a second filter combination both in (filtering) operation (both input valve means open, both output valve means open, and both seasoning valve means closed), cleaning the first filter combination by closing the input and output valve means of the first filter combination, rotating the container in the first filter combination until at least a substantial fraction of the pollutant has been removed therefrom and has dropped into a region below the container, gradually opening the input and seasoning valve means of the first filter combination so that one portion of the fluid stream flows first through the first filter combination and thence through the second filter combination while another portion of the fluid stream continues to flow directly from the source through the second filter combination, closing the input valve means of the second filter combination so that the fluid stream flows therethrough only via the first filter combination, opening the output valve means, and closing the seasoning valve means, of the first filter combination, closing the output valve means of the second filter combination, rotating the container in the second filter combination until at least a substantial fraction of the pollutant has been removed therefrom and has dropped into a region below the container, gradually opening the input and seasoning valve means of the second filter combination so that one portion of the fluid stream flows first through the second filter combination and thence through the first filter combination while another portion of the fluid stream continues to flow directly from the source through the first filter combination, closing the input valve means of the first filter combination so that the fluid stream flows therethrough only via the second filter combination, 'opening the output valve means, and closing the seasoning valve means, of the second filter combination, and closing the output valve means of the first filter combination, rotating the container in the first filter combination until at least a substantial fraction of the pollutant has been removed therefrom and has dropped into a region below the container, and so on repeatedly as long as desired.

7. A method as in claim 2, wherein, during the rotation of the container with the output valve closed, fluid is directed via purge valve means back through the region inside the inner side into and through the annular container to the region around the outer side, to assist in the removal of pollutant from the container and to avoid any flow of pollutant into the region inside the inner side of the container.

8. Apparatus for removing a pollutant such as dust from a fluid stream comprising a nested array of fibers in a substantially annular container having openings in its inner and outer cylindrical sides of such size as to retain the fibers within the container while permitting fluid to pass through easily, means for passing the pollutant-containing fluid stream through at least a substantial portion of the container from a region outside the outer side to a region inside the inner side, means for separating a substantial fraction of the pollutant from the fluid stream in a portion of the nested array generally nearer to the outer side of the container than to the inner side, and means for rotating the container about its axis from time to time to remove a substantial fraction of the separated pollutant from the nested array by tumbling action and by the force of gravity through the openings in the outer side of the container.

9. Apparatus as in claim 8, comprising also means for directing the fluid stream from the region inside the inner side via output valve means to means for utilizing the cleaned fluid.

10. Apparatus as in claim 9, wherein the output valve means is closed during the times when the container is rotated.

11. Apparatus as in claim 9, wherein the pollutant that is removed drops into a region below the container, and comprising also means for directing the pollutant thence from time to time via a pollutant outlet valve to means for disposing of the pollutant.

12. Apparatus as in claim 9, comprising also at least one additional combination of such container, array of fibers, and output valve means to form a filter system through which the fluid may pass to the means for utilizing the cleaned fluid, and wherein at least one output valve means is open at any given time during operation, to provide a path for the fluid stream through the filter system.

13. Apparatus as in claim 9, comprising also means for directing fluid during the rotation of the container with the output valve closed, via purge valve means back through the region inside the inner side into and through the annular container to the region around the outer side, to assist in the removal of pollutant from the container and to avoid any flow of pollutant into the region inside the inner side of the container.

14. Apparatus as in claim 8, wherein the outer cylindrical side of the annular container comprises a pair of substantially parallel walls in which each opening in one wall is located opposite an obstructing area in the other wall, to assure an absence of any straight path by which a loose fiber could pass through both walls.

15. Apparatus as in claim 8, wherein the inner cylindrical side of the annular container comprises a pair of substantially parallel walls in which each opening in one wall is located opposite an obstructing area in the other wall, to assure an absence of any straight path by which a loose fiber coud pass through both walls.

* * * * *